United States Patent
Frischkemuth et al.

(10) Patent No.: US 7,179,400 B2
(45) Date of Patent: Feb. 20, 2007

(54) STABILIZATION COMPOSITION FOR HALOGEN-CONTAINING POLYMERS

(75) Inventors: Bernd Frischkemuth, München (DE); Christian Helbig, München (DE)

(73) Assignee: Baerlocher GmbH, Unterschleibheim (DE)

( * ) Notice: Subject to any disclaimer, the term of this patent is extended or adjusted under 35 U.S.C. 154(b) by 0 days.

(21) Appl. No.: 11/140,395

(22) Filed: May 26, 2005

(65) Prior Publication Data

US 2005/0288414 A1    Dec. 29, 2005

Related U.S. Application Data

(63) Continuation of application No. PCT/EP03/13256, filed on Nov. 25, 2003.

(30) Foreign Application Priority Data

Nov. 26, 2002    (DE) ............... 102 55 155

(51) Int. Cl.
*C08K 3/32* (2006.01)
*C08K 3/16* (2006.01)
*C09K 21/04* (2006.01)
*C09K 21/10* (2006.01)
*C01B 11/18* (2006.01)

(52) U.S. Cl. ............ 252/182.29; 252/182.32; 252/182.33; 252/187.23; 252/187.25; 252/187.27; 252/187.28; 252/602; 252/609; 524/241; 524/247; 524/433; 524/414; 524/418; 524/86; 524/401; 524/402; 423/475; 423/476

(58) Field of Classification Search ............ None
See application file for complete search history.

(56) References Cited

U.S. PATENT DOCUMENTS

| | | | |
|---|---|---|---|
| 4,427,816 A | | 1/1984 | Aoki et al. |
| 4,751,261 A | | 6/1988 | Miyata et al. |
| 4,797,426 A | | 1/1989 | Waki et al. |
| 5,232,967 A | | 8/1993 | Worschech et al. |
| 5,241,094 A | | 8/1993 | Razvan et al. |
| 5,298,545 A | | 3/1994 | Razvan et al. |
| 5,312,941 A | | 5/1994 | Razvan et al. |
| 5,356,982 A | | 10/1994 | Razvan et al. |
| 5,519,077 A | * | 5/1996 | Drewes et al. ........... 524/114 |
| 6,084,013 A | * | 7/2000 | Wehner ............... 524/100 |
| 6,194,494 B1 | | 2/2001 | Wehner et al. |
| 6,274,654 B1 | * | 8/2001 | Wehner et al. ........... 524/100 |
| 2003/0209696 A1 | * | 11/2003 | Reith et al. ............ 252/400.1 |
| 2004/0132874 A1 | * | 7/2004 | Hauk et al. ............... 524/86 |
| 2004/0132875 A1 | * | 7/2004 | Wehner et al. ............ 524/86 |
| 2004/0138354 A1 | * | 7/2004 | Fokken et al. ........... 524/241 |
| 2004/0143044 A1 | | 7/2004 | Adams et al. |
| 2004/0242739 A1 | * | 12/2004 | Daute et al. ............. 524/157 |

FOREIGN PATENT DOCUMENTS

| | | |
|---|---|---|
| DE | 40 02 988 A1 | 8/1991 |
| DE | 41 06 404 C1 | 7/1992 |
| DE | 41 06 411 C1 | 7/1992 |
| DE | 42 04 887 A1 | 8/1993 |
| DE | 100 38 721 A1 | 2/2002 |
| DE | 100 56 880 A1 | 5/2002 |
| DE | 102 55 155 A1 | 6/2004 |
| EP | 0 259 783 B1 | 9/1987 |
| EP | 0 256 872 A2 | 2/1988 |
| EP | 0 506 831 B1 | 12/1990 |
| EP | 1 046 668 B1 | 10/1996 |
| EP | 0 742 259 B1 | 11/1996 |
| EP | 0 930 332 A2 | 12/1998 |
| JP | 55080445 | 6/1980 |
| JP | 57080444 | 5/1982 |
| WO | WO 02/092686 A1 | 11/2002 |
| WO | WO 03/082974 A1 | 10/2003 |
| WO | WO 2004/048453 A1 | 6/2004 |

OTHER PUBLICATIONS

W.V. Titow, *PVC Technology*, 4th Edition, Elsevier Publishers, 1984, p. 165-170.
E.J. Wickson, *Handbook of PVC Formulating*, John Wiley & Sons, Inc. 1993, p. 393-449.
International Search Report dated Jul. 13, 2005, for International Application No. PCT/EP2003/013256.
R. Gächter, et al., "Stabilizers, Processing Aids, Plasticizers, Fillers, reinforcements, Colorants for Thermoplastics," *Plastics Additives Handbook*, vol. 3. Aug. 1989, pp. 328-333; 368-387; 390-395; 398-401; 406-407; 424-425; and 456-467.
Schlumpf, *Fillers and Reinforcements*, 1990, p. 525-591.

\* cited by examiner

*Primary Examiner*—Joseph D. Anthony
(74) *Attorney, Agent, or Firm*—Alston & Bird LLP

(57) ABSTRACT

The invention is a stabilizer composition for halogen-containing polymers, comprising a carrier material of the general formula $Ca_xAl_2(OH)_{2(x+2)}HPO_3 \cdot m\, H_2O$, wherein x is a number from 2 to 12 and m is a number from 0 to 12, and a salt of a halogen-containing oxy acid or a mixture of two or more such salts, at least one salt of a halogen-containing oxy acid being present in finely distributed form on the carrier material, to a process for the preparation thereof, and to the use thereof.

20 Claims, No Drawings

STABILIZATION COMPOSITION FOR HALOGEN-CONTAINING POLYMERS

CROSS-REFERENCE TO RELATED APPLICATIONS

This is a continuation application of PCT/EP2003/013256, filed Nov. 25, 2003, which is incorporated herein by reference in its entirety, and also claims the benefit of German Priority Application No. 102 55 155.3, filed Nov. 26, 2002.

FIELD OF THE INVENTION

The present invention relates to a stabiliser composition for halogen-containing polymers and polymer mixtures, comprising a carrier material of the general formula $Ca_xAl_2(OH)_{2(x+2)}HPO_3 \cdot m\, H_2O$, wherein x is a number from 2 to 12 and m is a number from 0 to 12, and a salt of a halogen-containing oxy acid or a mixture of two or more such salts, at least one salt of a halogen-containing oxy acid being present in finely distributed form on the carrier material, to a process for the preparation thereof and to the use thereof.

BACKGROUND OF THE INVENTION

Halogen-containing, thermoplastic resin compositions or moulded articles produced therefrom are degraded or decomposed by the action of heat or light. It is therefore necessary to add stabilisers to such resins. For particularly demanding articles, such as profiles, plates or tubes, there are customarily used for this purpose inorganic and/or organic compounds of toxic heavy metals such as lead, barium or cadmium. For the stabilisation of, e.g., hard PVC articles, where good thermal stability and good resistance to light and weathering are required, dibasic lead phosphite has gained particular importance. For example, DD-B 61 095 mentions the use of basic lead phosphite as a stabiliser against the degradation of PVC by heat; a different use of basic lead phosphite for PVC hard foam mixtures is described in U.S. Pat. No. 4,797,426.

Because basic lead phosphite, like other heavy-metal-containing stabilisers, is classified as toxic, attempts are being made to find alternative stabilisers. A large number of combinations of inorganic and organic compounds are known as stabilisers for halogen-containing, thermoplastic resins.

JP-B 1 213 865 and JP-A 80 445/80 propose a hydrotalcite as stabiliser. That substance is superior to mixtures of Ca/Zn metal soaps in terms of heat stability and transparency, but the use of hydrotalcite does not solve the problem of discoloration of the resin during processing. In accordance with JP-A 80 444/82 it is proposed to overcome that problem by using combinations of hydrotalcite and 1,3-diketone compounds.

EP 0 930 332 A2 relates to stabiliser combinations comprising aminouracils and at least one further substance selected from a range of aluminium, lithium and calcium-aluminium compounds. A disadvantage, however, is that the described stabilisers do not satisfy all demands in respect of thermal stability and initial colour.

EP 0 506 831 B1 relates to basic calcium-aluminium hydroxyphosphites and to their use as stabilisers for halogen-containing polymers. The stabilisers described in the said publication do not, however, exhibit the desired activity in all the required areas.

DE 100 56 880 A1 and DE 100 38 721 A1 relate to stabiliser compounds for halogen-containing organic plastics. The production of the stabilised products is in each case effected by homogenising and plasticising a PVC powder mixture and the formulation components mentioned in the printed specifications for 5 min. at 170° C. However, the content of sodium perchlorate obtained from the described formulations lies within a range that does not have sufficient activity.

The problem underlying the invention was therefore to provide novel stabiliser compositions, and a process for the preparation thereof, that are suitable especially as stabilisers for halogen-containing polymers but do not exhibit the above-mentioned disadvantages of the known stabilisers and, especially, that are classified as non-toxic. A further problem underlying the invention was to provide stabiliser compositions that broaden the user's scope for formulation to the effect that he can dispense with the additives required according to the prior art, such as zinc salts or aminouracils, without any appreciable deterioration of the result. A particular problem underlying the present invention was to provide novel stabiliser compositions, and a process for the preparation thereof, that are suitable especially as stabilisers for soft PVC, hard PVC and PVC hard foam (free foam, Celuka foam).

SUMMARY OF THE INVENTION

It has now been found that calcium-aluminium hydrogen phosphites, when loaded with a finely distributed salt of a halogen-containing oxy acid, especially with a perchlorate salt, exhibit excellent stabilising properties for halogen-containing polymers.

The problems underlying the invention are therefore solved by stabiliser compositions and processes for their preparation as described in greater detail in the context of the following text.

The present invention therefore relates to a stabiliser composition for halogen-containing polymers, comprising a carrier material of the general formula (I) $Ca_xAl_2(OH)_{2(x+2)}HPO_3 \cdot m\, H_2O(I)$, wherein x is a number from 2 to 12 and m is a number from 0 to 12, and a salt of a halogen-containing oxy acid or a mixture of two or more such salts, at least one salt of a halogen-containing oxy acid being present in finely distributed form on the carrier material.

DETAILED DESCRIPTION OF THE INVENTION

Stabiliser compositions in accordance with the present invention have at least one carrier material, there being used as carrier material calcium-aluminium hydroxyphosphites of the general formula (I) $Ca_xAl_2(OH)_{2(x+2)}HPO_3 \cdot m\, H_2O(I)$, wherein x is a number from 2 to 8 and m is a number from 0 to 12.

A "stabiliser composition" is to be understood in the context of the present invention as being a composition that can be used for stabilising halogen-containing polymers. For achieving that stabilising effect, a stabiliser composition according to the invention is generally mixed with a halogen-containing polymer to be stabilised and then processed. It is equally possible, however, for a stabiliser composition according to the invention to be mixed with the halogen-containing polymer during processing.

The term "carrier material" is to be understood as being a material that can have, at least on the surface, a compound other than the carrier material which is present in finely distributed form on the carrier material. The expression "on the carrier material" is to be interpreted as meaning that at least a major portion of the compound present on the carrier material adheres firmly to the carrier material as a result of interactions between the carrier material and the compound. The interactions can essentially be any interactions; for example ionic, electrostatic, covalent or Van der Waals forces or two or more such interactions simultaneously may provide adhesion to the carrier material.

In the formula I above, x is preferably a number from 3 to 6 and m is preferably a number from 2 to 4. Experiments using X-ray diffraction have shown that the compounds used according to the invention as carrier materials do not belong to the hydrotalcite type in respect of their crystal structure.

It has been found, surprisingly, that the compositions according to the invention comprising calcium-aluminium hydrogen phosphites and salts of halogen-containing oxy acids impart to halogen-containing, thermoplastic resins and to the moulded articles produced therefrom thermal stabilities comparable to basic lead phosphites. The compounds according to the invention prevent discoloration during the production of e.g. hard PVC moulded articles; the colour retention and stability to weathering of the moulded articles stabilised with the compounds according to the invention is also equivalent to products stabilised with toxic heavy metal compounds.

It has also been found that the use of the compositions according to the invention achieves excellent results also in the absence of commonly used co-stabilisers such as zinc salts or aminouracils. The present invention therefore relates both to compositions which may contain such co-stabilisers and to compositions which are free of zinc salts or free of aminouracils or free of zinc salts and aminouracils.

For the preparation of the calcium-aluminium hydroxyphosphites used according to the invention as carrier materials, for example mixtures of calcium hydroxide or calcium oxide, aluminium hydroxide and sodium hydroxide or of calcium hydroxide or calcium oxide and sodium aluminate are reacted with phosphorous acid in amounts suitable for the preparation of the desired compounds in an aqueous medium and the reaction product is separated and obtained in a manner known per se.

The reaction product directly obtained from the reaction described above can be separated from the aqueous reaction medium by known methods, preferably by filtration. The working-up of the separated reaction product is likewise effected in a manner known per se, for example by washing the filter cake with water and drying the washed residue at temperatures of, for example, 60–130° C., preferably at 90–120° C.

For the reaction there can be used either a finely particulate, active aluminium hydroxide in combination with sodium hydroxide or a sodium aluminate. Calcium can be used in the form of finely particulate calcium oxide or hydroxide or mixtures thereof. The phosphorous acid can be used in various concentrations.

The reaction temperatures are preferably between about 50 and 100° C., preferably between about 60 and 85° C. Catalysts or accelerators are not required. In the case of the compounds according to the invention, some or all of the water of crystallisation can be removed by thermal treatment. When used as stabilisers, the dried calcium-aluminium hydroxyphosphites used according to the invention do not split off water at the processing temperatures of 160–200° C. customary, for example, for hard PVC, so that no troublesome bubble formation occurs in the moulded articles.

To improve their dispersibility in halogen-containing thermoplastic resins, the compounds according to the invention can be coated with surface-active agents in known manner.

A stabiliser composition according to the invention has at least two constituents. In addition to a carrier material as first constituent, a stabiliser composition according to the invention also comprises at least one salt of a halogen-containing oxy acid. A stabiliser composition according to the invention preferably comprises at least one inorganic or organic salt of perchloric acid. Examples of suitable inorganic perchlorates are those of the general formula $M(ClO_4)_k$, wherein M is Li, Na, K, Mg, Ca, Sr, Zn, Al, La or Ce.

Suitable organic perchlorates are especially the onium salts of perchlorates, as described below. In the context of this text, the term "onium salt" denotes a compound that is an ammonium, sulfonium or phosphonium salt. An "onium salt" in accordance with the present invention is an organic onium salt. That means that the ammonium, sulfonium or phosphonium group of the onium salt carries at least one organic radical. An onium salt may carry 1, 2, 3 or 4 organic radicals according to the nature of the onium salt. The organic radicals can be bonded to the onium radical, for example, by way of a C—X linkage, where X is S, N or P. It is equally possible, however, for the organic radicals to be bonded to the onium radical by way of a further hetero atom, for example an O atom.

An onium perchlorate suitable for use in the context of the present invention has at least one positively charged N, P or S atom or two or more such positively charged N, P or S atoms or mixtures of two or more of the mentioned, positively charged, atoms.

In the context of the present invention, as onium perchlorates there are used compounds that carry at least one organic radical and at most the maximum possible number of organic radicals on the N, S or P atom. When an onium perchlorate suitable for use according to the invention carries a smaller number of organic radicals than is necessary for the formation of a positively charged onium ion, the positive charge is generated in a customary manner known to the person skilled in the art by protonation by means of a suitable acid, so that the onium perchlorate in question then carries at least one proton in addition to an organic radical.

It is therefore possible according to the invention to use as onium perchlorates compounds having a positive charge as a result of protonation reactions. It is, however, equally possible in the context of the stabiliser combinations according to the invention to use onium perchlorates having a positive charge as a result of a peralkylation reaction. Examples of such compounds are tetraalkylammonium, trialkylsulfonium and tetraalkylphosphonium perchlorates. It is, however, also provided in the context of the present invention for a peralkylated onium perchlorate suitable for use according to the invention to have an aryl, alkaryl, cycloalkyl, alkenyl, alkynyl or cycloalkenyl radical. It is likewise possible and provided according to the invention for an onium salt suitable for use in the context of a stabiliser composition according to the invention to have two or possibly more different types of substituent, for example an alkyl radical and a cycloalkyl radical or an alkyl radical and an aryl radical.

It is likewise possible and provided in the context of the present invention for an onium salt suitable for use in a stabiliser composition according to the invention to have substituents that are themselves substituted by one or more functional groups. The term "functional groups" denotes groups that improve the activity of the stabiliser composition or at least do not impair that activity or impair it only to a negligible extent. Such functional groups can be, for example, NH groups, NH$_2$ groups, OH groups, SH groups, ester groups, ether groups, thioether groups, isocyanurate groups or keto groups or mixtures of two or more thereof.

Phosphonium perchlorates suitable for use in the context of the present invention are in principle any compounds that, by appropriate reaction of suitable reactants, result in a phosphonium perchlorate. Phosphonium perchlorates suitable for use according to the invention can be obtained, for example, by appropriate reaction of tetraalkyl-, tetracycloalkyl- or tetraaryl-phosphorus halides. Suitable phosphonium perchlorates are therefore derived, for example, from tetraalkylphosphorus salts, such as tetra-n-ethylphosphonium bromide, tetra-n-propylphosphonium bromide, tetra-n-butylphosphonium bromide, tetra-n-isobutylphosphonium bromide, tetra-n-pentylphosphonium bromide, tetra-n-hexylphosphonium bromide and like tetraalkylphosphorus salts. Also suitable in principle for use in the context of the stabiliser compositions according to the invention are phosphonium perchlorates derived, for example, from tetracycloalkylphosphorus salts or tetraarylphosphorus salts. Suitable phosphonium perchlorates are therefore based, for example, on tetracycloalkyl- or tetraaryl-phosphorus salts such as tetracyclohexylphosphonium bromide or tetraphenylphosphonium bromide and like tetracycloalkyl- or tetraaryl-phosphorus salts. The compounds mentioned above can be unsubstituted in the context of the present invention, but they may also have one or more of the above-mentioned substituents provided that, in the context of the stabiliser composition, those substituents have no disadvantageous activity and have no adverse effect on the intended use of the stabiliser composition.

Also suitable for use in the context of the present invention are organic phosphonium perchlorates that carry a phosphorus atom different types of organic substituents which may optionally be differently substituted.

Within the scope of a preferred embodiment of the present invention, tetra-n-butylphosphonium perchlorate or triphenylbenzylphosphonium perchlorate is used as phosphonium perchlorate.

Sulfonium perchlorates suitable for use in the context of the present invention are in principle any compounds that, by appropriate reaction of suitable reactants, result in a sulfonium perchlorate. Sulfonium perchlorates suitable for use according to the invention can be obtained, for example, by appropriate reaction of sulfides such as alkyl monosulfides, alkyl disulfides, dialkylsulfides or polyalkylsulfides. Suitable sulfonium perchlorates are therefore derived, for example, from dialkyl sulfides such as ethyl benzyl sulfide, allyl benzyl sulfide or alkyl disulfides such as hexane disulfide, heptane disulfide, octane disulfide and like alkyl disulfides. Also suitable in principle for use in the context of the stabiliser compositions according to the invention are sulfonium perchlorates derived, for example, from tricycloalkylsulfonium salts or triarylsulfonium salts. Suitable sulfonium perchlorates are therefore based, for example, on tricycloalkyl- or triaryl-sulfonium salts such as tricyclohexylsulfonium bromide or triphenylsulfonium bromide and like tricycloalkyl- or triaryl-sulfonium salts. Also suitable are trialkyl-, triaryl- or tricycloalkyl-sulfoxonium salts such as trimethylsulfoxonium perchlorate. The compounds mentioned above can be unsubstituted in the context of the present invention, but they may also have one or more of the above-mentioned substituents provided that, in the context of the stabiliser composition, those substituents have no disadvantageous activity and have no adverse effect on the intended use of the stabiliser composition.

Also suitable for use in the context of the present invention are organic sulfonium perchlorates that carry a sulfur atom different types of organic substituents which may optionally be differently substituted. Within the scope of a preferred embodiment of the present invention, trimethyl sulfoxonium perchlorate is used as sulfonium perchlorate.

Ammonium perchlorates suitable for use in the context of the present invention are in principle any compounds that, by appropriate reaction of suitable reactants, result in an ammonium perchlorate. Ammonium perchlorates suitable for use in accordance with the invention can be obtained, for example, by appropriate reaction of amines or amides such as alkyl monoamines, alkylenediamines, alkyl polyamines, or secondary or tertiary amines. Suitable ammonium perchlorates are therefore derived, for example, from primary mono- or poly-amino compounds having from 2 to about 40 carbon atoms, for example from 6 to about 20 carbon atoms. Examples thereof are ethylamine, n-propylamine, isopropylamine, n-butylamine, sec-butylamine, tert-butylamine, and substituted amines having from 2 to about 20 carbon atoms, such as 2-(N,N-dimethylamino)-1-aminoethane. Suitable diamines have, for example, two primary, two secondary, two tertiary or one primary and one secondary or one primary and one tertiary or one secondary and one tertiary amino group(s). Examples thereof are diaminoethane, the isomeric diaminopropanes, the isomeric diaminobutanes, the isomeric diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane or tertiary amines such as triethylamine, tributylamine, trihexylamine, triheptylamine, trioctylamine, dimethylbenzylamine, N-ethyl-, N-methyl-, N-cyclohexyl-morpholine, dimethylcyclohexylamine, dimorpholinodiethyl ether, 1,4-diazabicyclo[2.2.2]octane, 1-azabicyclo[3.3.0]octane, N,N,N',N'-tetramethylethylenediamine, N,N,N',N'-tetramethylbutanediamine, N,N,N',N'-tetramethylhexane-1,6-diamine, pentamethyldiethylenetriamine, tetramethyldiaminoethyl ether, bis(dimethylaminopropyl)urea, N,N'-dimethylpiperazine, 1,2-dimethylimidazole or di(4-N,N-dimethylaminocyclohexyl)methane.

Especially suitable and preferred in the context of the present invention are aliphatic amino alcohols having from 2 to about 40 carbon atoms, preferably from 6 to about 20 carbon atoms, for example triethanolamine, tripropanolamine, triisopropanolamine, tributanolamine, tri-tert-butanolamine, tripentanolamine, 1-amino-3,3-dimethyl-pentan-5-ol, 2-aminohexane-2',2"-diethanolamine, 1-amino-2,5-dimethylcyclohexan-4-ol, 2-aminopropanol, 2-aminobutanol, 3-aminopropanol, 1-amino-2-propanol, 2-amino-2-methyl-1-propanol, 5-aminopentanol, 3-aminomethyl-3,5,5-trimethylcyclohexanol, 1-amino-1-cyclopentane-methanol, 2-amino-2-ethyl-1,3-propanediol, 2-(dimethylaminoethoxy)-ethanol, and aromatic-aliphatic or aromatic-cycloaliphatic amino alcohols having from 6 to about 20 carbon atoms, there being used as aromatic structures heterocyclic or isocyclic ring systems such as naphthalene derivatives or, especially, benzene derivatives, such as 2-aminobenzyl alcohol, 3-(hydroxymethyl)aniline, 2-amino-3-phenyl-1-propanol, 2-amino-1-phenylethanol, 2-phenylglycinol or 2-amino-1-phenyl-1,3-propanediol and also mixtures of two or more such compounds.

Within the scope of a further embodiment of the present invention the ammonium perchlorates used are perchlorates of heterocyclic compounds having a cyclic ring system containing amino groups. For example, there are used the perchlorates of heterocyclic amino alcohols that have at least 2, preferably at least 3, amino groups in the ring. As central ring component of the ammonium perchlorates suitable for use according to the invention there are especially suitable the trimerisation products of isocyanates.

There are suitable, for example, hydroxyl-group-containing isocyanurates of the general formula II

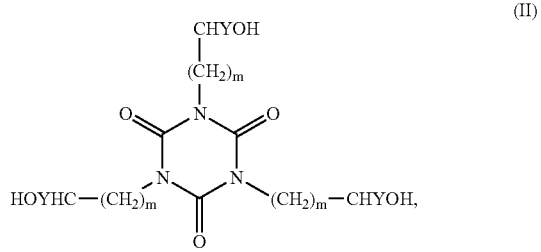

wherein the groups Y and the indices m are in each case identical or different and m is an integer from 0 to 20 and Y is a hydrogen atom or a linear or branched, saturated or unsaturated alkyl group having from 1 to about 10 carbon atoms. In the context of the present invention special preference is given to the use of tris(hydroxy-methyl)isocyanurate (THEIC) as constituent of the stabiliser compositions according to the invention.

Also suitable as ammonium perchlorates are, for example, compounds in which the amino group is bonded to a substituted aromatic or heteroaromatic system, for example aminobenzoic acid, aminosalicylic acid or aminopyridinecarboxylic acid and suitable derivatives thereof.

Within the scope of a preferred embodiment of the present invention there are used as ammonium perchlorates 2-ethylcarboxypyridinium perchlorate, formamidinium perchlorate, tetra-n-butyl phosphonium perchlorate, trimethylsulfoxonium perchlorate, the perchlorate salt of trishydroxyethyl isocyanurate, the perchlorate salt of 2-(diethylamino)-ethanol, of triethanolamine or of triisopropanolamine, N-(2-hydroxyethyl)-morpholinium perchlorate or trioctylammonium perchlorate or mixtures of two or more thereof.

A stabiliser composition according to the invention in the context of the present invention may, for example, comprise only one of the above-mentioned onium perchlorates. In the context of the present invention it is equally possible and also provided for a stabiliser composition according to the invention to comprise a mixture of two or more of the above-mentioned onium perchlorates. It may be a mixture of two or more different types of onium perchlorates, that is to say, for example, a mixture of ammonium perchlorates and sulfonium perchlorates or ammonium perchlorates and phosphonium perchlorates or sulfonium perchlorates and phosphonium perchlorates or ammonium perchlorates and sulfonium perchlorates and phosphonium perchlorates. It is equally possible in the context of the invention for a stabiliser composition according to the invention to comprise a mixture of two or more onium perchlorates of one type, that is to say a mixture of two or more ammonium perchlorates and a mixture of two or more sulfonium perchlorates and a mixture of two or more phosphonium perchlorates.

For example, a stabiliser composition according to the invention may in the context of the present invention comprise only one salt of a halogen-containing oxy acid. It is, however, equally possible and provided in the context of the present invention for a stabiliser composition according to the invention to comprise a mixture of two or more salts of halogen-containing oxy acids. Within the scope of a preferred embodiment of the present invention, a stabiliser composition according to the invention comprises at least sodium perchlorate.

The salt of a halogen-containing oxy acid or a mixture of two or more such salts is present according to the invention in finely distributed form on the carrier material. The term "finely distributed" is to be understood as requiring that discrete particles of the salt of a halogen-containing oxy acid or of a mixture of two or more such salts are present on the carrier material, insofar as such discrete particles are present or identifiable at all, do not exceed an average particle size of 10 µm. The term is preferably to be interpreted as meaning that, as a whole, particularly in the case of the salt, the particle size does not exceed 10 µm, especially 5 µm or 1 µm. Customary methods, such as light microscopy or electron microscopy, can be used for determining the particle size.

As already stated above, the expression "on the carrier material" is to be interpreted as meaning that at least a major portion of the compound present on the carrier material adheres firmly to the carrier material as a result of interactions between the carrier material and the compound. The interactions can essentially be any interactions; for example ionic, electrostatic, covalent or Van der Waals forces or two or more such interactions simultaneously may provide adhesion to the carrier material.

Within the scope of a preferred embodiment of the present invention, a stabiliser composition according to the invention therefore comprises a mixture of a carrier material and a salt of a halogen-containing oxy acid in which a maximum of 10% by weight of at least one salt of a halogen-containing oxy acid is separable from the carrier material by simple mechanical separation methods, for example by screening. "Simple mechanical separation methods" are to be understood in the context of this text as being separation methods in which substantially only particles present separately from one another or only weakly adhering to one another prior to carrying out the separating method are separated.

In addition to comprising a salt of a halogen-containing oxy acid or a mixture of two or more such salts that are present in finely distributed form on a carrier material, a stabiliser composition according to the invention may also comprise another salt of a halogen-containing oxy acid or a mixture of two or more such salts that in the sense of the above definition are not present in finely distributed form on the carrier material.

For example, less than 10% by weight of the salts of the halogen-containing oxy acid or of the mixture of two or more such salts, insofar as the salts can be present in crystalline form, may have crystallites of a size of more than 30 µm or more than 20 µm or more than 10 µm. It follows that at least 90% by weight of such salts have crystallites of a size of less than 30 µm or less than 20 µm or less than 10 µm. The average particle size in the above-mentioned case preferably lies within a range of from about 0.5 to about 30 µm, for example from about 1 to about 20 µm.

The crystallite sizes of salts of halogen-containing oxy acids that, in the stabiliser composition according to the invention, are not present on a carrier material, insofar as those salts form crystallites, can in principle be determined by any methods of determining particle sizes. Methods that are suitable in principle include, for example, screening methods, sedimentation methods and methods based on the diffraction or refraction of electromagnetic waves, especially of light. Also suitable are electron microscopic methods, such as scanning electron microscopy or transmission electron microscopy.

The proportion of salts of a halogen-containing oxy acid or of a mixture of two or more halogen-containing oxy acids in the stabiliser composition according to the invention is in total from about 0.1 to about 30% by weight, especially from about 0.5 to about 20% by weight. Examples of contents of salts of a halogen-containing oxy acid or of a mixture of two or more such salts are from about 1 to about 15% by weight or from about 2 to about 10% by weight.

Preferably from about 0.1 to about 100% by weight of the salts of a halogen-containing oxy acid or of the mixture of two or more such salts, for example from about 10 to about 99% by weight or from about 20 to about 95% by weight or from about 40 to about 90% by weight, in each case based on the total amount of salts of halogen-containing oxy acids in the stabiliser composition according to the invention, are present on the carrier material.

The ratio of salt or salts of a halogen-containing oxy acid to carrier material can be arranged essentially as desired within limits specified in view of the desired stabilisation result. When a stabiliser composition according to the invention is to comprise exclusively a salt or such a mixture of two or more salts of a halogen-containing oxy acid present on a carrier material insofar as the carrier material is to have the desired amount of salt or salts of a halogen-containing oxy acid in the sense of the above definition, the ratio should be such that the amount of salt or salts of a halogen-containing oxy acid can still be taken up by the carrier material without there being proportions of salt or salts of a halogen-containing oxy acid present separately from the carrier material. For example, in the context of the present invention the ratio of salt or salts of a halogen-containing oxy acid to carrier material should be from 1:100 to 1:1.

The carrier material itself in the context of the present invention should be present in particle form and preferably should not exceed an average particle size of 100 μm. The carrier material preferably has a particle size of 50 μm or less, especially a particle size of 30 μm or less or of 10 μm or less. Methods suitable in principle for determining particle size are, for example, screening methods, sedimentation methods and methods based on the diffraction or refraction of electromagnetic waves, especially of light. The laser diffraction method is especially suitable. Also suitable are electron microscopic methods, such as scanning electron microscopy or transmission electron microscopy.

In addition to comprising the two main constituents described above, a stabiliser composition according to the invention may also comprise one or more additives. Especially suitable additives are, for example, blowing agents. Suitable blowing agents are, for example, organic azo and hydrazo compounds, tetrazoles, oxazines, isatoic anhydride, salts of citric acid, for example ammonium citrate, and also sodium carbonate and sodium hydrogen carbonate. Especially suitable are, for example, ammonium citrate, azodicarbonamide or sodium hydrogen carbonate or mixtures of two or more thereof. Also suitable are physical blowing agents, such as liquids that pass into the gaseous state when the temperature is suitably increased or gases, for example water, $CO_2$ (supercritical), air or inert gases such as hydrogen, helium, argon or the like.

Within the scope of a preferred embodiment of the present invention, a stabiliser composition according to the invention comprises at least one blowing agent. The proportion of blowing agents in a stabiliser composition according to the invention is preferably from about 0.01 to about 20% by weight, for example from about 0.1 to about 10% by weight or from about 0.5 to about 5% by weight.

Also suitable as additives in the context of the present invention are, for example, amino alcohols. Suitable amino alcohols in the context of the present invention are in principle any compounds having at least one OH group and a primary, secondary or tertiary amino group or a combination of two or more of the mentioned amino groups. In principle, in the context of the present invention both solid and liquid amino alcohols are suitable as a constituent of the stabiliser compositions according to the invention. In the context of the present invention, however, the proportion of liquid amino alcohols is, for example, so chosen that the entire stabiliser composition is substantially in solid form.

Amino alcohols suitable for use in the context of the present invention have, within the scope of a preferred embodiment of the present invention, a melting point higher than about 30° C., especially higher than about 50° C. Suitable amino alcohols are, for example, mono- or polyhydroxy compounds which are based on linear or branched, saturated or unsaturated aliphatic mono- or poly-amines.

There are suitable in this connection, for example, OH-group-carrying derivatives of primary mono- or poly-amino compounds having from 2 up to about 40, for example from 6 up to about 20, carbon atoms. Examples thereof are corresponding OH-group-carrying derivatives of ethylamine, n-propylamine, isopropylamine, n-propylamine, sec-propylamine, tert-butylamine, 1-aminoisobutane, and substituted amines having from 2 to about 20 carbon atoms, such as 2-(N,N-dimethylamino)-1-aminoethane. Suitable OH-group-carrying derivatives of diamines are, for example, those based on diamines having a molecular weight of from about 32 to about 200 g/mol, the corresponding diamines having at least two primary, two secondary, or one primary and one secondary amino group(s). Examples thereof are diaminoethane, the isomeric diaminopropanes, the isomeric diaminobutanes, the isomeric diaminohexanes, piperazine, 2,5-dimethyl-piperazine, amino-3-aminomethyl-3,5,5-trimethylcyclohexane (isophoronediamine, IPDA), 4,4'-diaminodicyclohexylmethane, 1,4-diaminocyclohexane, amino-ethylethanolamine, hydrazine, hydrazine hydrate or triamines, such as diethylenetriamine or 1,8-diamino-4-aminomethyloctane, triethylamine, tributylamine, dimethylbenzylamine, N-ethyl-, N-methyl-, N-cyclohexyl-morpholine, dimethylcyclohexylamine, dimorpholinodiethyl ether, 1,4-diazabicyclo[2.2.2]octane, 1-azabicyclo[3.3.0]octane, N,N,N',N'-tetramethylethylenediamine, N,N,N',N'-tetramethylbutanediamine, N,N,N',N'-tetramethyl-1,6-hexanediamine, pentamethyldiethylenetriamine, tetramethyldiaminoethyl ether, bis(dimethylaminopropyl)urea, N,N'-dimethylpiperazine, 1,2-dimethylimidazole or di(4-N,N-dimethylaminocyclohexyl)methane.

Especially suitable are aliphatic amino alcohols having from 2 to about 40, preferably from 6 to about 20, carbon atoms, for example 1-amino-3,3-dimethyl-pentan-5-ol, 2-aminohexane-2',2"-diethanolamine, 1-amino-2,5-dimethylcyclohexan-4-ol, 2-aminopropanol, 2-aminobutanol, 3-aminopropanol, 1-amino-2-propanol, 2-amino-2-methyl-1-propanol, 5-aminopentanol, 3-aminomethyl-3,5,5-trimethylcyclohexanol, 1-amino-1-cyclopentane-methanol, 2-amino-2-ethyl-1,3-propanediol, 2-(dimethylaminoethoxy)-ethanol, aromatic-aliphatic or aromatic-cycloaliphatic amino alcohols having from 6 to about 20 carbon atoms, there coming into consideration as aromatic structures heterocyclic or isocyclic ring systems such as naphthalene derivatives or, especially, benzene derivatives, such as 2-aminobenzyl alcohol, 3-(hydroxymethyl)aniline, 2-amino-3-phenyl-1-propanol, 2-amino-1-phenylethanol, 2-phenylglycinol or 2-amino-1-phenyl-1,3-propanediol, and also mixtures of two or more such compounds.

Within the scope of an especially preferred embodiment of the present invention, the amino alcohols used are heterocyclic compounds having a cyclic ring system containing amino groups, the OH groups being bonded to the ring either directly or preferably by way of spacers. Within the scope of an especially preferred embodiment of the present invention there are used heterocyclic amino alcohols that have at least 2, preferably at least 3, amino groups in the ring. As central ring component of the amino alcohols suitable for use according to the invention there are especially suitable the trimerisation products of isocyanates.

Special preference is given to hydroxyl-group-containing isocyanurates of the general formula II already mentioned above. In the context of the present invention, special preference is given to the use of tris(hydroxymethyl)isocyanurate (THEIC) as constituent of the stabiliser compositions according to the invention.

A stabiliser composition according to the invention may, for example, comprise only one amino alcohol. In the context of the present invention, however, a stabiliser composition according to the invention may equally comprise a mixture of two or more different amino alcohols.

Also suitable as additives in the context of the present invention are compounds having a structural element of the general formula III

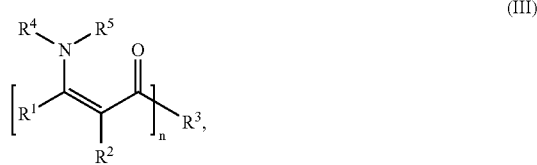

(III)

wherein n is a number from 1 to 100,000, the radicals $R^4$, $R^5$, $R^1$ and $R^2$ are, each independently of the others, hydrogen, an unsubstituted or substituted linear or branched, saturated or unsaturated aliphatic alkyl radical having from 1 to 44 carbon atoms, an unsubstituted or substituted saturated or unsaturated cycloalkyl radical having from 6 to 44 carbon atoms, or an unsubstituted or substituted aryl radical having from 6 to 44 carbon atoms or an unsubstituted or substituted aralkyl radical having from 7 to 44 carbon atoms, or the radical $R^1$ is an unsubstituted or substituted acyl radical having from 2 to 44 carbon atoms or the radicals $R^1$ and $R^2$ are linked to form an aromatic or heterocyclic system and wherein the radical $R^3$ is hydrogen, an unsubstituted or substituted, linear or branched, saturated or unsaturated aliphatic alkyl or alkylene radical or oxyalkyl or oxyalkylene radical or mercaptoalkyl or mercaptoalkylene radical or aminoalkyl or aminoalkylene radical having from 1 to 44 carbon atoms, an unsubstituted or substituted saturated or unsaturated cycloalkyl or cycloalkylene radical or oxycycloalkyl or oxycycloalkylene radical or mercaptocycloalkyl or mercaptocycloalkylene radical or aminocycloalkyl or aminocycloalkylene radical having from 6 to 44 carbon atoms or an unsubstituted or substituted aryl or arylene radical having from 6 to 44 carbon atoms or an ether or thioether radical having from 1 to 20 O or S atoms or O and S atoms, or is a polymer that is bonded to the structural element in brackets by way of O, S, NH, $NR^4$ or $CH_2C(O)$, or the radical $R^3$ is so linked to the radical $R^1$ that in total an unsubstituted or substituted, saturated or unsaturated heterocyclic ring system having from 4 to 24 carbon atoms is formed, or a mixture of two or more compounds of the general formula III.

Within the scope of a preferred embodiment of the present invention, as the compound of the general formula III there is used a compound based on an α,β-unsaturated β-aminocarboxylic acid, especially a compound based on β-aminocrotonic acid. Especially suitable are the esters or thioesters of corresponding aminocarboxylic acids with monovalent or polyvalent alcohols or mercaptans wherein X in each of the mentioned cases is O or S.

When the radical $R^3$ together with X is an alcohol or mercaptan radical, such a radical can be formed, for example, from methanol, ethanol, propanol, isopropanol, butanol, 2-ethylhexanol, isooctanol, isononanol, decanol, lauryl alcohol, myristyl alcohol, palmityl alcohol, stearyl alcohol, ethylene glycol, propylene glycol, 1,3-butanediol, 1,4-butanediol, 1,6-hexanediol, 1,10-decanediol, diethylene glycol, thio-diethanol, trimethylolpropane, glycerol, tris(2-hydroxymethyl) isocyanurate, triethanolamine, pentaerythritol, di-trimethylolpropane, diglycerol, sorbitol, mannitol, xylitol, di-pentaerythritol and also the corresponding mercapto derivatives of the mentioned alcohols.

Within the scope of an especially preferred embodiment of the present invention, as the compound of the general formula III there is used a compound in which $R^1$ is a linear alkyl radical having from 1 to 4 carbon atoms, $R^2$ is hydrogen and $R^3$ is a linear or branched, saturated, mono- to hexa-valent alkyl or alkylene radical having from 2 to 12 carbon atoms or a linear, branched or cyclic 2- to 6-valent ether alcohol radical or thioether alcohol radical.

Suitable compounds of the general formula III include, for example, β-aminocrotonic acid stearyl ester, 1,4-butanediol di(β-aminocrotonic acid) ester, thio-diethanol-α-aminocrotonic acid ester, trimethylolpropane tri-β-aminocrotonic acid ester, pentaerythritol-tetra-β-aminocrotonic acid ester, dipentaerythritol-hexa-β-aminocrotonic acid ester and the like. The mentioned compounds can be present in a stabiliser composition according to the invention singly or as a mixture of two or more thereof.

Also suitable as compounds of the general formula III in the context of the present invention are aminouracil compounds of the general formula IV

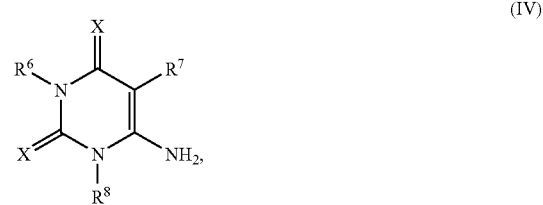

(IV)

wherein the radicals $R^6$ and $R^7$ are, each independently of the other, hydrogen, an unsubstituted or substituted linear or branched, saturated or unsaturated aliphatic alkyl radical having from 1 to 44 carbon atoms, an unsubstituted or substituted saturated or unsaturated cycloalkyl radical having from 6 to 44 carbon atoms, or an unsubstituted or substituted aryl radical having from 6 to 44 carbon atoms or an unsubstituted or substituted aralkyl radical having from 7 to 44 carbon atoms, and the radical $R^8$ is hydrogen, an unsubstituted or substituted linear or branched, saturated or unsaturated aliphatic hydrocarbon radical having from 1 to 44 carbon atoms, an unsubstituted or substituted saturated or unsaturated cycloaliphatic hydrocarbon radical having from 6 to 44 carbon atoms or an unsubstituted or substituted aromatic hydrocarbon radical having from 6 to 44 carbon atoms.

The compound according to formula IV thus falls within the scope of the compounds according to formula III wherein n in the general formula III is 1 and the radicals $R^1$ and $R^3$ according to the general formula IV are linked to form the structural element of the general formula V

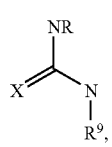

(V)

wherein X is S or O. $R^1$ in the case of a compound of the general formula VI is therefore N—$R^9$, while $R^3$ is —RN—C=X and the two radicals are covalently linked by way of a N—C bond to form a heterocyclic ring. In the context of the present invention it is preferable to use compounds of the general formula V wherein $R^9$ is hydrogen.

Within the scope of a further preferred embodiment of the present invention, in the stabiliser compositions according to the invention there are used compounds of the general formula V wherein $R^6$ and $R^8$ are a linear or branched alkyl radical having from 1 to 6 carbon atoms, for example methyl, ethyl, propyl, butyl, pentyl or hexyl, an OH-group-substituted linear or branched alkyl radical having from 1 to 6 carbon atoms, for example hydroxymethyl, hydroxyethyl, hydroxypropyl, hydroxybutyl, hydroxypentyl or hydroxyhexyl, an aralkyl radical having from 7 to 9 carbon atoms, for example benzyl, phenylethyl, phenylpropyl, dimethylbenzyl or phenylisopropyl, it being possible for the mentioned aralkyl radicals to be substituted, for example, by halogen, hydroxy or methoxy, or an alkenyl radical having from 3 to 6 carbon atoms, for example vinyl, alkyl, methallyl, 1-butenyl or 1-hexenyl.

Within the scope of a preferred embodiment of the present invention, in the stabiliser compositions according to the invention there are used compounds of the general formula V wherein $R^6$ and $R^8$ are hydrogen, methyl, ethyl, n-propyl, isopropyl, n-, iso-, sec-, or tert-butyl.

Also suitable as compounds of the general formula III are, for example, compounds in which the radicals $R^1$ and $R^2$ are linked to form an aromatic or heteroaromatic system, for example aminobenzoic acid, aminosalicylic acid or aminopyridinecarboxylic acid and suitable derivatives thereof.

Within the scope of a preferred embodiment of the present invention, a stabiliser composition according to the invention comprises a compound of the general formula III or a mixture of two or more compounds of the general formula III, for example a compound of the general formula II, in an amount of from about 0.1 to about 99.5% by weight, especially from about 5 to about 50% by weight or from about 5 to about 25% by weight.

Further suitable additives in the context of the present invention are, for example, compounds having at least one mercapto-functional $sp^2$-hybridised carbon atom. Compounds having at least one mercapto-functional $sp^2$-hybridised carbon atom are to be understood in the context of the present invention as being in principle any compounds having a structural element Z=CZ-SH or a structural element $Z_2C=S$, it being possible for the two structural elements to be tautomeric forms of a single compound. Z is an atom or a structural element allowing the formation of corresponding tautomeric structures, for example N or C. The $sp^2$-hybridised carbon atom may be a constituent of an unsubstituted or substituted aliphatic compound or a constituent of an aromatic system. Suitable types of compound are, for example, thiocarbamic acid derivatives, thiocarbamates, thiocarboxylic acids, thiobenzoic acid derivatives, thioacetone derivatives or thiourea or thiourea derivatives. Suitable compounds having at least one mercapto-functional, $sp^2$-hybridised carbon atom are mentioned, for example, in the non-prior-published German patent application having the file reference 101 09 366.7. Within the scope of a preferred embodiment of the present invention, thiourea or a thiourea derivative is used as the compound having at least one mercapto-functional, $sp^2$-hybridised carbon atom.

Examples of additives also suitable for the stabiliser compositions according to the invention are carbazole or carbazole derivatives or mixtures of two or more thereof. Further suitable additives are, for example, 2,4-pyrrolidinedione and derivatives thereof, such as are mentioned, for example, in the non-prior-published German patent application having the file reference 101 09 366.7.

Also suitable as additives are, for example, epoxy compounds. Examples of such epoxy compounds are epoxidised soybean oil, epoxidised olive oil, epoxidised linseed oil, epoxidised castor oil, epoxidised groundnut oil, epoxidised maize oil, epoxidised cottonseed oil, and also glycidyl compounds. Glycidyl compounds contain a glycidyl group that is bonded directly to a carbon, oxygen, nitrogen or sulfur atom. Glycidyl or methylglycidyl esters are obtainable by reaction of a compound having at least one carboxyl group in the molecule and epichlorohydrin or glycerol dichlorohydrin or methyl-epichlorohydrin. The reaction is advantageously carried out in the presence of bases.

As compounds having at least one carboxyl group in the molecule there can be used, for example, aliphatic carboxylic acids. Examples of such carboxylic acids are glutaric acid, adipic acid, pimelic acid, suberic acid, azelaic acid, sebacic acid or dimerised or trimerised linoleic acid, acrylic acid, methacrylic acid, caproic acid, caprylic acid, lauric acid, myristic acid, palmitic acid, stearic acid or pelargonic acid and also the mono- or poly-carboxylic acids mentioned hereinbelow. Also suitable are cycloaliphatic carboxylic acids, such as cyclohexanecarboxylic acid, tetrahydrophthalic acid, 4-methyltetrahydrophthalic acid, hexahydrophthalic acid, endomethylene-tetrahydrophthalic acid or 4-methylhexahydrophthalic acid. Also suitable are aromatic carboxylic acids, such as benzoic acid, phthalic acid, isophthalic acid, trimellitic acid and pyromellitic acid.

Glycidyl ethers or methylglycidyl ethers can be obtained by reaction of a compound having at least one free alcoholic OH group or a phenolic OH group and a suitably substituted epichlorohydrin under alkaline conditions or in the presence of an acidic catalyst and subsequent alkali treatment. Ethers of this type are derived, for example, from acyclic alcohols, such as ethylene glycol, diethylene glycol or higher poly(oxyethylene) glycols, propane-1,2-diol or poly(oxypropylene) glycols, butane-1,4-diol, poly(oxytetramethylene) glycols, pentane-1,5-diol, hexane-1,6-diol, hexane-2,4,6-triol, glycerol, 1,1,1-trimethylolpropane, bis-trimethylolpropane, pentaerythritol, sorbitol, and also from polyepichlorohydrins, butanol, amyl alcohol, pentanol, and also from monofunctional alcohols, such as isooctanol, 2-ethylhexanol, isodecanol or technical alcohol mixtures, for example technical fatty alcohol mixtures.

Suitable ethers are also derived from cycloaliphatic alcohols, such as 1,3- or 1,4-dihydroxycyclohexane, bis(4-hydroxycyclohexyl)methane, 2,2-bis(4-hydroxycyclohexyl) propane or 1,1-bis(hydroxymethyl)cyclohexan-3-ene, or they have aromatic nuclei, such as N,N-bis(2-hydroxyethyl) aniline. Suitable epoxy compounds can also be derived from mononuclear phenols, for example from phenol, resorcinol or hydroquinone, or they are based on polynuclear phenols, such as bis(4-hydroxyphenyl)methane, 2,2-bis(4-hydroxyphenyl)propane, 2,2-bis(3,5-dibromo-4-hydroxyphenyl) propane, 4,4'-dihydroxydiphenylsulfones, or on condensation products of phenol with formaldehyde, for example phenol novolaks, obtained under acidic conditions.

Further terminal epoxides suitable as additives in the context of the present invention are, for example, glycidyl-1-naphthyl ether, glycidyl-2-phenyl phenyl ether, 2-diphenylglycidyl ether, N-(2,3-epoxypropyl)phthalimide and 2,3-epoxypropyl-4-methoxyphenyl ether.

Also suitable are N-glycidyl compounds, such as are obtainable by dehydro-chlorination of the reaction products of epichlorohydrin with amines containing at least one amino hydrogen atom. Such amines are, for example, aniline, N-methylaniline, toluidine, n-butylamine, bis(4-aminophenyl)methane, m-xylylenediamine and bis(4-methylaminophenyl)methane. Likewise suitable are S-glycidyl compounds, for example di-S-glycidyl ether derivatives, that are derived from dithiols, such as ethane-1,2-dithiol or bis(4-mercaptomethylphenyl) ether.

Especially suitable epoxy compounds are described, for example, on pages 3 to 5 of EP-A 1 046 668, reference being expressly made to the disclosure contained therein, which is to be regarded as part of the disclosure of this text.

Also suitable as additives in the context of the present invention are 1,3-dicarbonyl compounds, especially the β-diketones and β-keto esters. Suitable in the context of the present invention are dicarbonyl compounds of the general formula R'C(O)CHR"—C(O)R''', as described, for example, on page 5 of EP 1 046 668, to which reference is expressly made especially in respect of the radicals R', R" and R''' and the disclosure of which is regarded as being part of the disclosure of this text. Especially suitable are, for example, acetylacetone, butanoyl acetone, heptanoyl acetone, stearoyl acetone, palmitoyl acetone, lauroyl acetone, 7-tert-nonylthioheptanedione-2,4, benzoyl acetone, dibenzoylmethane, lauroylbenzoylmethane, palmitoylbenzoylmethane, stearoylbenzoylmethane, isooctylbenzoylmethane, 5-hydroxycapronylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxybenzoyl)methane, benzoylformylmethane, benzoylacetylphenylmethane, 1-benzoyl-1-acetylnonane, stearoyl-4-methoxybenzoylmethane, bis(4-tert-butylbenzoyl)methane, benzoylphenylacetylmethane, bis(cyclohexanoyl)methane, dipivaloylmethane, 2-acetylcyclopentanone, 2-benzoylcyclopentanone, diacetoacetic acid methyl, ethyl, butyl, 2-ethylhexyl, dodecyl or octadecyl ester and also propionyl or butyryl acetic acid esters having from 1 to 18 carbon atoms, and also stearoyl acetic acid ethyl, propyl, butyl, hexyl or octyl esters or polynuclear β-keto esters, as described in EP-A 433 230, to which reference is expressly made, or dehydracetic acid and also the zinc, magnesium or alkali salts thereof or the alkali, alkaline earth or zinc chelates of the mentioned compounds insofar as they exist.

1,3-Diketo compounds can be present in a stabiliser composition according to the invention in an amount of up to about 20% by weight, for example up to about 10% by weight.

Polyols are also suitable as additives in the context of the stabiliser composition according to the invention. Suitable polyols are, for example, pentaerythritol, dipentaerythritol, tripentaerythritol, bistrimethylolpropane, inositol, polyvinyl alcohol, bistrimethylolethane, trimethylolpropane, sorbitol, maltitol, isomaltitol, lactitol, lycasine, mannitol, lactose, leucrose, tris(hydroxymethyl) isocyanurate, palatinite, tetramethylolcyclohexanol, tetramethylolcyclopentanol, tetramethylolcycloheptanol, glycerol, diglycerol, polyglycerol, thiodiglycerol or 1-0-α-D-glycopyranosyl-D-mannitol dihydrate. The polyols suitable as additives can be present in a stabiliser composition according to the invention in an amount of up to about 30% by weight, for example up to about 10% by weight.

Also suitable as additives are, for example, sterically hindered amines, such as those mentioned on pages 7 to 27 of EP-A 1 046 668. Reference is expressly made to the sterically hindered amines disclosed therein, the compounds mentioned therein being regarded as part of the disclosure of this text. The sterically hindered amines suitable as additives can be present in a stabiliser composition according to the invention in an amount of up to about 30% by weight, for example up to about 10% by weight.

Also suitable as additives in the stabiliser compositions according to the invention are hydrotalcites, zeolites and alkali alumocarbonates. Suitable hydrotalcites, zeolites and alkali alumocarbonates are described, for example, on pages 27 to 29 of EP-A 1 046 668, on pages 3, 5 and 7 of EP-A 256 872, on pages 2 and 3 of DE-C 41 06 411 or on pages 2 and 3 of DE-C 41 06 404. Reference is expressly made to those specifications, and their disclosure at the indicated places is regarded as being part of the disclosure of this text. The hydrotalcites, zeolites and alkali alumocarbonates suitable as additives can be present in a stabiliser composition according to the invention in an amount of up to about 50% by weight, for example up to about 30% by weight.

Also suitable as additives in the context of the stabiliser compositions according to the invention are, for example, hydrocalumites of the general formula VI

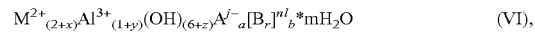

$$M^{2+}{}_{(2+x)}Al^{3+}{}_{(1+y)}(OH)_{(6+z)}A^{j-}{}_a[B_r]^{rl}{}_b*mH_2O \qquad (VI),$$

wherein M is calcium, magnesium or zinc or a mixture of two or more thereof, A is a j-valent inorganic or organic acid anion, j is 1, 2 or 3, B is an inorganic or organic acid anion other than A, r is a whole number ≧1 and, when is r>1, indicates the degree of polymerisation of the acid anion, and l is 1, 2, 3 or 4 and indicates the valency of the acid anion, where, for r=1, l is 2, 3 or 4 and, for r>1, l indicates the valency of the individual monomer units of the polyanion and is 1, 2, 3 or 4 and rl indicates the total valency of the polyanion, and the following rules apply to the parameters x, y, a, b, r, z and j:

$0 \leq x < 0.6$,
$0 \leq y < 0.4$, where either x=0 or y=0,
$0 < a < 0.8/r$ and
$z = 1 + 2x + 3y - ja - r/b$.

Within the scope of a preferred embodiment of the present invention, as additives there are used compounds of the general formula VI wherein M is calcium, which may be in admixture with magnesium or zinc or magnesium and zinc.

In the general formula VI, A is an r-valent inorganic or organic acid anion, wherein r is 1, 2 or 3. Examples of acid anions present in the context of hydrocalumites suitable for use according to the invention are halide ions, $SO_3^{2-}$, $SO_4^{2-}$, $S_2O_3^{2-}$, $S_2O_4^{2-}$, $HPO_3^{2-}$, $PO_4^{3-}$, $CO_3^{2-}$, alkyl and dialkyl phosphates, alkyl mercaptides and alkyl sulfonates, wherein the alkyl groups may be identical or different, straight-chain, branched or cyclic and preferably have from 1 to about 20 carbon atoms. Also suitable as acid anions A are the anions of optionally functionalised di-, tri- or tetra-carboxylic acids, such as maleate, phthalate, aconitate, trimesate, pyromellitate, maleate, tartrate, citrate and also anions of the isomeric forms of hydroxyphthalic acid or hydroxymesic acid. Within the scope of a preferred embodiment of the present invention, A is an inorganic acid anion, especially a halide ion, for example $F^-$, $Cl^-$ or $Br^-$, preferably $Cl^-$.

In the general formula VI, B is an acid anion other than A. For the case where r in the general formula VI is the number 1, the letter B denotes an 1-valent inorganic or organic acid anion, wherein l is the number 2, 3 or 4. Examples of acid anions B present in the context of compounds of the general formula V suitable for use according to the invention are, for example, $O^{2-}$, $SO_3^{2-}$, $SO_4^{2-}$, $S_2O_3^{2-}$, $S_2O_4^{2-}$, $HPO_3^{2-}$, $PO_4^{3-}$, $CO_3^{2-}$, alkyl and dialkyl phosphates, alkyl mercaptides and alkyl sulfonates, wherein the alkyl groups may be identical or different, straight-chained or branched or cyclic and preferably have from 1 to about 20 carbon atoms. Also suitable as acid anions A are the anions of optionally functionalised di-, tri- or tetra-carboxylic acids, such as maleate, phthalate, aconitate, trimesate, pyromellitate, maleate, tartrate, citrate, and also anions of the isomeric forms of hydroxyphthalic acid or hydroxymesic acid. B in the context of the present invention in formula V is preferably a borate or an anion of an optionally functionalised di-, tri- or tetra-carboxylic acid. Special preference is given to carboxylic acid anions and anions of hydroxycarboxylic acids having at least two carboxyl groups, very special preference being given to citrates.

For the case where r in the general formula VI is a number greater than 1, the term $[B_r]^{rl-}$ denotes an inorganic or organic polyanion having a degree of polymerisation r and the valency l of the individual monomer units of the polyanion with the total valency rl, wherein l is equal to or greater than 1. Examples of suitable polyanions $[B_r]^{rl-}$ are polyacrylates, polycarboxylates, polyborates, polysilicates, polyphosphates or polyphosphonates.

In all the above-mentioned cases, the acid anions A and B can be present in any desired ratio a/b in the compounds of the general formula VI.

The compounds of the general formula VI are not compounds having a layered structure of the hydrotalcite or hydrocalumite type but a physical mixture of $M^{2+}$/aluminium oxide hydrates with salts of divalent metals. X-ray diffractograms of the compounds of the general formula VI used in the composition according to the invention clearly show that they are not discrete crystalline compounds of a known type but mixtures that are amorphous to X-rays.

For the preparation of the compounds according to the general formula VI, solutions or suspensions of oxidic forms of the desired cations (e.g. $NaAlO_2$, $Ca(OH)_2$, $Zn(OH)_2$, $Al(OH)_3$) can, following known procedures, be mixed with solutions or suspensions of salts or the corresponding acids of the desired anions and reacted at temperatures of from 40 to 95° C., it being possible for the reaction times to be varied between 15 and 300 minutes.

When surface-treatment of the reaction products is desired, the surface-treatment medium can be added directly to the reaction products and the product can be separated from the mother liquor by filtration and dried at suitable temperatures between 100 and 250° C. The added amount of surface-treatment medium is, for example, from about 1 to about 20% by weight.

In the context of the stabiliser compositions according to the invention, compounds of the general formula VI can be used in an amount of up to about 50% by weight, for example up to about 30% by weight or up to about 15% by weight.

Within the scope of a further embodiment of the present invention, a stabiliser composition according to the invention comprises at least one basic calcium salt. Suitable basic calcium salts are, for example, calcium oxide, calcium carbonate and, unless it is already a necessary constituent of the stabiliser compositions according to the invention, calcium hydroxide. The basic calcium salts may optionally have been surface-modified.

Also suitable as additives to the stabiliser composition according to the invention are metal oxides, metal hydroxides and metal soaps of saturated, unsaturated, straight-chain or branched, aromatic, cycloaliphatic or aliphatic carboxylic acids or hydroxycarboxylic acids having especially from about 2 to about 22 carbon atoms.

As metal cations, the metal oxides, metal hydroxides or metal soaps suitable as additives have especially a divalent cation; the cations of calcium or zinc or lead or mixtures of two or more thereof are especially suitable, but within the scope of a preferred embodiment of the present invention the stabiliser compositions according to the invention are zinc-free.

Examples of suitable carboxylic acid anions include anions of monovalent carboxylic acids, such as acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, lauric acid, isostearic acid, stearic acid, 12-hydroxystearic acid, 9,10-dihydroxystearic acid, oleic acid, 3,6-dioxaheptanoic acid, 3,6,9-trioxadecanoic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, sorbic acid, anions of divalent carboxylic acids or monoesters thereof, such as oxalic acid, malonic acid, maleic acid, tartaric acid, cinnamic acid, mandelic acid, malic acid, glycolic acid, oxalic acid, salicylic acid, polyglycoldicarboxylic acids having a degree of polymerisation of from approximately 10 to approximately 12, phthalic acid, isophthalic acid, terephthalic acid or hydroxyphthalic acid, anions of tri- or tetra-valent carboxylic acids or mono-, di- or tri-esters thereof, as in hemimellitic acid, trimellitic acid, pyromellitic acid or citric acid, and also so-called overbased carboxylates as described, for example, in DE-A 41 06 404 or DE-A 40 02 988, the disclosure of the last-mentioned documents being regarded as part of the disclosure of this text.

Within the scope of a preferred embodiment of the present invention there are used as additives metal soaps having anions derived from saturated or unsaturated carboxylic acids or hydroxycarboxylic acids having from about 8 to about 20 carbon atoms. Special preference is given to stearates, oleates, laurates, palmitates, behenates, versatates, hydroxystearates, dihydroxystearates, p-tert-butyl benzoates or (iso)octanoates of calcium or zinc or mixtures of two or more thereof.

A stabiliser composition according to the invention can comprise the mentioned metal oxides, metal hydroxides or metal soaps, or a mixture of two or more thereof, in an amount of up to about 50% by weight, for example in an amount of up to about 30% by weight.

A stabiliser composition according to the invention can furthermore comprise as thermostabiliser component an organotin compound or a mixture of two or more organotin compounds. Suitable organotin compounds are, for example, methyltin-tris(isooctyl-thioglycolate), methyltin-tris(isooctyl-3-mercaptopropionate), methyltin-tris(isodecyl-thioglycolate), dimethyltin-bis(isooctyl-thioglycolate), dibutyltin-bis(isooctyl-thioglycolate), monobutyltin-tris (isooctyl-thioglycolate), dioctyltin-bis(isooctyl-thioglycolate), monooctyltin-tris(isooctyl-thioglycolate) or dimethyltin-bis(2-ethylhexyl-p-mercaptopropionate), solid or liquid tin maleates and mixtures thereof or commercially available organotin salts or mixtures of two or more of the mentioned compounds.

Furthermore, in the context of the stabiliser compositions according to the invention it is possible to use the organotin compounds which are mentioned and the preparation of which is described on pages 18 to 29 of EP-A 0 742 259. Reference is expressly made to the above-mentioned disclosure, the compounds mentioned therein and their preparation being understood as being part of the disclosure of this text.

A stabiliser composition according to the invention can comprise the described organotin compounds in an amount of from 0 up to about 20% by weight, especially from 0 up to about 10% by weight.

Within the scope of a further embodiment of the present invention, a stabiliser composition according to the invention can comprise organic phosphite esters having from 1 to 3 organic radicals, two or more of which radicals may be identical or all of which may be different. Suitable organic radicals are, for example, linear or branched, saturated or unsaturated alkyl radicals having from 1 to 24 carbon atoms, unsubstituted or substituted alkyl radicals having from 6 to 20 carbon atoms or unsubstituted or substituted aralkyl radicals having from 7 to 20 carbon atoms. Examples of suitable organic phosphite esters are tris(nonylphenyl), trilauryl, tributyl, trioctyl, tridecyl, tridodecyl, triphenyl, octyldiphenyl, dioctylphenyl, tri(octylphenyl), tribenzyl, butyldicresyl, octyl-di(octylphenyl), tris(2-ethylhexyl), tritolyl, tris(2-cyclohexylphenyl), tri-a-naphthyl, tris(phenylphenyl), tris(2-phenylethyl), tris(dimethylphenyl), tricresyl or tris(p-nonylphenyl) phosphite or tristearyl sorbitoltriphosphite or mixtures of two or more thereof.

A stabiliser composition according to the invention can comprise the described phosphite compounds in an amount of from 0 up to about 30% by weight, especially from 0 up to about 10% by weight.

A stabiliser composition according to the invention can also comprise as additives blocked mercaptans, as mentioned on pages 4 to 18 of EP-A 0 742 259. Reference is expressly made to the disclosure in the specification indicated, which is understood as being part of the disclosure of this text. A stabiliser composition according to the invention can comprise the described blocked mercaptans in an amount of from 0 up to about 30% by weight, especially from 0 up to about 10% by weight.

A stabiliser composition according to the invention can also comprise lubricants, such as paraffin waxes, polyethylene waxes, polypropylene waxes, montan waxes, ester lubricants, such as fatty acid esters, purified or hydrogenated natural or synthetic triglycerides or partial esters, amide waxes, chloroparaffins, glycerol esters or alkaline earth soaps. Lubricants suitable for use are also described in "Kunststoffadditive", R. Gächter/H. Müller, Carl Hanser Verlag, 3rd edition, 1989, pages 478–488. Also suitable as lubricants are, for example, fatty ketones, as described in DE 4,204,887, and also silicone-based lubricants, as mentioned, for example, in EP-A 0 259 783, or combinations thereof, as mentioned in EP-A 0 259 783. Reference is expressly made to the mentioned documents, the disclosure of which relating to lubricants is to be regarded as being part of the disclosure of this text. Especially suitable in the context of the present invention are lubricants of the product range Baerolub® from Baerlocher GmbH (Unterschleißheim, Germany). A stabiliser composition according to the invention can comprise the described lubricants in an amount of from 0 up to about 70% by weight, especially up to about 40% by weight.

Also suitable as additives for stabiliser compositions according to the present invention are organic plasticisers. Suitable as plasticisers are, for example, compounds from the group of phthalic acid esters, such as dimethyl, diethyl, dibutyl, dihexyl, di-2-ethylhexyl, di-n-octyl, diisooctyl, diisononyl, diisodecyl, dicyclohexyl, dimethylcyclohexyl, dimethyl glycol, dibutyl glycol, benzylbutyl or diphenyl phthalate and also mixtures of phthalates, for example mixtures of alkyl phthalates having from 7 to 9 or 9 to 11 carbon atoms in the ester alcohol or mixtures of alkyl phthalates having from 6 to 10 and 8 to 10 carbon atoms in the ester alcohol. Especially suitable in the sense of the present invention are dibutyl, dihexyl, di-2-ethylhexyl, di-n-octyl, diisooctyl, diisononyl, diisodecyl, diisotridecyl and benzylbutyl phthalate and also the mentioned mixtures of alkyl phthalates.

Also suitable as plasticisers are the esters of aliphatic dicarboxylic acids, especially the esters of adipic, azelaic or sebacic acid or mixtures of two or more thereof. Examples of such plasticisers are di-2-ethylhexyl adipate, diisooctyl adipate, diisononyl adipate, diisodecyl adipate, benzylbutyl adipate, benzyloctyl adipate, di-2-ethylhexyl azelate, di-2-ethylhexyl sebacate and diisodecyl sebacate. Within the scope of a further embodiment of the present invention preference is given to di-2-ethylhexyl acetate and diisooctyl adipate.

Also suitable as plasticisers are trimellitic acid esters, such as tri-2-ethylhexyl trimellitate, triisotridecyl trimellitate, triisooctyl trimellitate and also trimellitic acid esters having from 6 to 8, 6 to 10, 7 to 9 or 9 to 11 carbon atoms in the ester group or mixtures of two or more of the mentioned compounds.

Suitable plasticisers are also, for example, polymer plasticisers, as mentioned in "Kunststoffadditive", R. Gachter/H. Müller, Carl Hanser Verlag, 3rd edition, 1989, chapter 5.9.6, pages 412–415, or "PVC Technology", W. V. Titow, 4th Edition, Elsevier Publishers, 1984, pages 165–170. The starting materials most commonly used for the preparation of polyester plasticisers are, for example, dicarboxylic acids, such as adipic, phthalic, azelaic or sebacic acid, and diols, such as 1,2-propanediol, 1,3-butanediol, 1,4-butanediol, 1,6-hexanediol, neopentyl glycol or diethylene glycol or mixtures of two or more thereof.

Also suitable as plasticisers are phosphoric acid esters, such as those in "Taschenbuch der Kunststoffadditive", chapter 5.9.5, pages 408–412. Examples of suitable phosphoric acid esters are tributyl phosphate, tri-2-ethylbutyl phosphate, tri-2-ethylhexyl phosphate, trichloroethyl phosphate, 2-ethyl-hexyl-di-phenyl phosphate, triphenyl phosphate, tricresyl phosphate or trixylenyl phosphate, or mixtures of two or more thereof.

Also suitable as plasticisers are chlorinated hydrocarbons (paraffins) or hydrocarbons as described in "Kunststoffadditive", R. Gächter/H. Müller, Carl Hanser Verlag, 3rd edition, 1989, chapter 5.9.14.2, pages 422–425, and chapter 5.9.14.1, page 422.

A stabiliser composition according to the invention can comprise the described plasticisers in an amount of from 0 up to about 99.5% by weight, especially up to about 30% by weight, up to about 20% by weight or up to about 10% by weight. Within the scope of a preferred embodiment of the present invention, the lower limit for the described plasticisers as constituent of the stabiliser compositions according to the invention is about 0.1% by weight or more, for example about 0.5% by weight, 1% by weight, 2% by weight or 5% by weight.

Pigments are also suitable as constituents of the stabiliser compositions according to the invention. Examples of suitable inorganic pigments are titanium dioxide, carbon black, $Fe_2O_3$, $Sb_2O_3$, $(Ba, Sb)O_2$, $Cr_2O_3$, spinels, such as cobalt blue and cobalt green, Cd (S, Se) or ultramarine blue. Suitable organic pigments are, for example, azo pigments, phthalocyanine pigments, quinacridone pigments, perylene pigments, diketopyrrolopyrrole pigments or anthraquinone pigments.

A stabiliser composition according to the invention can also comprise fillers, such as those described on pages 393 to 449 of "Handbook of PVC Formulating", E. J. Wickson, John Wiley & Sons, Inc., 1993, or reinforcing agents, such as those described on pages 549 to 615 of "Taschenbuch der Kunststoffadditive", R. Gächter/H. Müller, Carl Hanser Verlag, 1990. Especially suitable fillers or reinforcing agents are, for example, calcium carbonate (chalk), dolomite, wollastonite, magnesium oxide, magnesium hydroxide, silicates, glass fibres, talc, kaolin, chalk, carbon black or graphite, wood flour or other renewable raw materials. Within the scope of a preferred embodiment of the present invention, a stabiliser composition according to the invention comprises chalk.

Within the scope of a further embodiment of the present invention, the stabiliser compositions according to the invention can comprise antioxidants, UV absorbers and light stabilisers or blowing agents. Suitable antioxidants are described, for example, on pages 33 to 35 of EP-A 1 046 668. Antioxidants preferred in the context of the present invention are the products of the Irganox® range (manufacturer: Ciba Specialty Chemicals), for example Irganox® 1010 or 1076 or products of Lowinox range from Great Lakes.

Suitable UV absorbers and light stabilisers are mentioned on pages 35 and 36 of EP-A 1 046 668. Reference is expressly made to both disclosures, the disclosures being regarded as part of this text.

A stabiliser composition according to the invention can also comprise impact strength modifiers and processing aids, gelling agents, antistatics, biocides, metal deactivators, optical brighteners, flame retardants and also antifogging compounds. Suitable compounds of those classes of compound are described, for example, in "Kunststoff Additive", R. Kessler/H. Müller, Carl Hanser Verlag, 3rd edition, 1989 and also in "Handbook of PVC Formulating", E. J. Wilson, J. Wiley & Sons, 1993.

The stabiliser compositions according to the invention can in principle be prepared in their simplest form by mixing together a carrier material of the general formula (I) $Ca_xAl_2(OH)_{2(x+2)}HPO_3 \cdot m\ H_2O(I)$, wherein x is a number from 2 to 12 and m is a number from 0 to 12, and a salt of a halogen-containing oxy acid or a mixture of two or more such salts, at least one salt of a halogen-containing oxy acid being present in dissolved form during mixing.

The present invention therefore relates also to a stabiliser composition which can be prepared by mixing together a carrier material of the general formula (I) $Ca_xAl_2(OH)_{2(x+2)}HPO_3 \cdot m\ H_2O(I)$, wherein x is a number from 2 to 12 and m is a number from 0 to 12, and a salt of a halogen-containing oxy acid or a mixture of two or more such salts, at least one salt of a halogen-containing oxy acid being present in dissolved form during mixing.

Suitable solvents for the salts of a halogen-containing oxy acid or a mixture of two or more such salts are in principle any solvents which, on the one hand, dissolve a sufficient amount of the salt of a halogen-containing oxy acid or the mixture of two or more such salts and, on the other hand, can be removed again, after mixing with the pulverulent carrier material, optionally by heating of the mixture or by the application of reduced pressure or by a combination of the two measures, so that a mixture of carrier material and carrier-supported salt of a halogen-containing oxy acid or a mixture of two or more such salts is formed.

In principle, the added amount of dissolved salt of a halogen-containing oxy acid or of the mixture of two or more such salts may be freely selected within the limits already mentioned above in the text. It has proved advantageous, however, for the salt of a halogen-containing oxy acid or the mixture of two or more such salts to be added, during mixing, in an amount of from 1 to 50% by weight, based on halogen-containing oxy acid and carrier material.

"Mixing" in the context of the present text is also to be understood as being a process in which a suitable salt of a halogen-containing oxy acid is precipitated from a solution in the presence of the carrier material.

Such a stabiliser composition can also, as already described above, comprise one or more additives.

The present invention relates also to a process for the preparation of a stabiliser composition according to the invention in which a carrier material of the general formula $Ca_xAl_2(OH)_{2(x+2)}HPO_3 \cdot m\ H_2O$, wherein x is a number from 2 to 12 and m is a number from 0 to 12, and a salt of a halogen-containing oxy acid or a mixture of two or more such salts are mixed together, at least one salt of a halogen-containing oxy acid being present in dissolved form during mixing.

The reaction of the pulverulent carrier material with the aqueous solution can be effected in principle in any desired way, provided that sufficient intermixing of powder and aqueous solution is ensured. For example, customary mixing apparatus, such as broom-type mixers or ploughshare mixers, are suitable for carrying out the process according to the invention. Especially suitable, however, are methods that result in an especially fine distribution of the components that react with one another, for example fluidised bed methods, spray tower methods or jet stream methods.

The process according to the invention can also be carried out, for example, as a combination of mixing and grinding processes. In that case, for example during the grinding of an anhydride or a mixture of two or more anhydrides, as described above, an aqueous solution of a salt of a halogen-containing oxy acid or a mixture of two or more such salts can be supplied in the context of the grinding operation.

When a stabiliser composition according to the invention is to comprise one or more additives in addition to the two main components, those additives can be added before, during or after the mixing of the carrier material with the solution of the salt of a halogen-containing oxy acid or the mixture of two or more such salts. Addition of additives before or during the mixing should take place, however, only when the additives are inert towards the compounds being mixed. Otherwise, namely when the additives are not inert, they are added (where the stabiliser composition according to the invention is to comprise such additives) only after the reaction.

The stabiliser compositions according to the invention are suitable for the stabilisation of halogen-containing polymers. The present invention therefore relates also to a polymer composition comprising a halogen-containing polymer or a mixture of two or more halogen-containing polymers and a stabiliser composition according to the invention.

Examples of such halogen-containing polymers are polymers of vinyl chloride, vinyl resins containing vinyl chloride units in the polymer backbone, copolymers of vinyl chloride and vinyl esters of aliphatic acids, especially vinyl acetate, copolymers of vinyl chloride with esters of acrylic and methacrylic acid or acrylonitrile or mixtures of two or more thereof, copolymers of vinyl chloride with diene compounds or unsaturated dicarboxylic acids or anhydrides thereof, for example copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and other compounds such as acrolein, crotonaldehyde, vinyl methyl ketone, vinyl methyl ether, vinyl isobutyl ether and the like, polymers and copolymers of vinylidene chloride with vinyl chloride and other polymerisable compounds, such as those already mentioned above, polymers of vinyl chloroacetate and dichlorodivinyl ether, chlorinated polymers of vinyl acetate, chlorinated polymeric esters of acrylic acid and α-substituted acrylic acids, chlorinated polystyrenes, for example polydichlorostyrene, chlorinated polymers of ethylene, polymers and post-chlorinated polymers of chlorobutadiene and copolymers thereof with vinyl chloride and also mixtures of two or more of the mentioned polymers or polymer mixtures that contain one or more of the above-mentioned polymers. Within the scope of a preferred embodiment of the present invention, the stabiliser compositions according to the invention are used for the production of moulded articles of PVC-U, such as window profiles, industrial profiles, tubes and plates.

Also suitable for stabilisation with the stabiliser compositions according to the invention are the graft polymers of PVC with EVA, ABS or MBS. Preferred substrates for such graft copolymers are also the afore-mentioned homo- and co-polymers, especially mixtures of vinyl chloride homopolymers with other thermoplastic or elastomeric polymers, especially blends with ABS, MBS, NBR, SAN, EVA, CPE; MBAS, PM (polyalkyl acrylate), PAMA (polyalkyl methacrylate, especially PMMA—polymethyl methacrylate), EPDM, polyamides or polylactones.

Likewise suitable for stabilisation with the stabiliser compositions according to the invention are mixtures of halogenated and non-halogenated polymers, for example mixtures of the above-mentioned non-halogenated polymers with PVC, especially mixtures of polyurethanes and PVC.

Furthermore, it is also possible for recyclates of chlorine-containing polymers to be stabilised with the stabiliser compositions according to the invention, in principle any recyclates of the above-mentioned halogenated polymers being suitable for this purpose. PVC recyclate, for example, is suitable in the context of the present invention.

Within the scope of a preferred embodiment of the present invention, a polymer composition according to the invention comprises the stabiliser composition according to the invention in an amount of from 0.1 to 20 phr, especially from approximately 0.5 to approximately 15 phr or from approximately 1 to approximately 12 phr. The unit phr represents "per hundred resin" and thus relates to parts by weight per 100 parts by weight of polymer.

A polymer composition according to the invention preferably comprises as halogenated polymer at least a proportion of PVC, the PVC content being especially at least about 20% by weight, preferably at least about 50% by weight, for example at least about 80% by weight or at least about 90% by weight.

The present invention relates also to a method of stabilising halogen-containing polymers in which a halogen-containing polymer or a mixture of two or more halogen-containing polymers or a mixture of one or more halogen-containing polymers and one or more halogen-free polymers is mixed with a stabiliser composition according to the invention.

The mixing together of polymer or polymers and the stabiliser composition according to the invention can in principle be effected at any time before or during the processing of the polymer. For example, the stabiliser composition can be mixed into the pulverulent or granular polymer prior to processing. It is equally possible, however, to add the stabiliser composition to the polymer or polymers in the softened or molten state, for example during processing in an extruder, in the form of an emulsion or dispersion, in the form of a pasty mixture or in the form of a dry mixture.

A polymer composition according to the invention can be brought into a desired form in known manner. Suitable methods are, for example, calendering, extrusion, injection-moulding, sintering, extrusion blowing or the plastisol process. A polymer composition according to the invention can also be used, for example, in the production of foamed materials. In principle, the polymer compositions according to the invention are suitable for the production of hard or soft PVC, especially for the production of PVC foams.

A polymer composition according to the invention can be processed to form moulded articles. The present invention therefore relates also to moulded articles, at least comprising a stabiliser composition according to the invention or a polymer composition according to the invention.

The term "moulded article" in the context of the present invention in principle includes any three-dimensional structures that can be produced from a polymer composition according to the invention. In the context of the present invention the term "moulded article" includes, for example, wire sheathings, automobile components, for example automobile components such as are used in the interior of the automobile, in the engine space or on the outer surfaces, cable insulations, decorative films, agricultural films, hoses, shaped sealing elements, office films, hollow bodies (bottles), packaging films (deep-draw films), blown films, tubes, foamed materials, heavy duty profiles (window frames), light wall profiles, structural profiles, sidings, fittings, plates, foamed panels, co-extrudates having a recycled core, or housings for electrical apparatus or machinery, for example computers or household appliances.

Further examples of moulded articles that can be produced from a polymer composition according to the invention are synthetic leather, floor coverings, textile coatings, wallcoverings, coil coatings and underseals for motor vehicles.

The present invention relates also to the use of a mixture of a carrier material of the general formula $Ca_xAl_2(OH)_{2(x+2)}HPO_3 \cdot m\, H_2O$, wherein x is a number from 2 to 12 and m is a number from 0 to 12, and a salt of a halogen-containing oxy acid or a mixture of two or more such salts, at least one salt of a halogen-containing oxy acid being present in finely distributed form on the carrier material, for the stabilisation of halogen-containing polymers.

The invention is explained in greater detail below by Examples:

EXAMPLES

Three differently stabilised PVC samples (formulations 1 to 3) were each tested for their decomposition rate by means of a dynamic stability test in a plasticorder. The dynamic stability test was carried out at 190° C./60 g at 30 rev/min. The state of discoloration of the three PVC samples was determined at five minute intervals. In addition, the time-point at which the PVC samples were completely decomposed was determined.

| Constituents | Formulation 1 Reference without perchlorate | Formulation 2 Reference + perchlorate | Formulation 3 according to the invention |
|---|---|---|---|
| Vestolit M 5867 (PVC) | 100 | 100 | 100 |
| Tyrin 6000 (chlorinated polyethylene) | 2 | 2 | 2 |
| Baerorapid 10 F (polymethyl methacrylate) | 8 | 8 | 8 |
| Titanium oxide | 4 | 4 | 4 |
| Azodicarbonamide | 4 | 4 | 4 |
| BS LSA (epoxidised soybean oil) | 0.4 | 0.4 | 0.4 |
| BP R 9283 PLS/F/1 (Ca/Zn stabiliser) | 7.35 | 7.35 | 7.35 |
| CHAP | 0.8 | — | — |
| Reference stabiliser (0.8 CHAP + 0.1 perchlorate according to DE 100 56 880 A1) | — | 0.9 | — |
| Perchlorate supported on CHAP according to the present patent application | — | — | 0.9 |

Dynamic Stability Test
Results:

| Decomposition of the PVC samples per time (min) | 1 | 2 | 3 |
|---|---|---|---|
| 5 | 0 | 0 | 0 |
| 10 | 7 | 4 | 1 |
| 15 | 8 | 5 | 4 |
| 20 | 9 | 6.5 | 5.5 |
| 20.4 | decomposes | | |
| 23.8 | | decomposes | |
| 24.1 | | | decomposes |

That which is claimed:

1. A stabiliser composition for halogen-containing polymers, comprising
   a carrier material of the general formula $Ca_xAl_2(OH)_{2(x+2)}HPO_3 \cdot m\, H_2O$, wherein x is a number from 2 to 12 and m is a number from 0 to 12, and
   one or more salts of a halogen-containing oxy acid, wherein at least one of said one or more salts of halogen-containing oxy acid is disposed on said carrier material in a finely distributed form.

2. The stabiliser composition according to claim 1, wherein said one or more salts of halogen-containing oxy acid comprises a mixture of two or more salts of halogen-containing oxy acid.

3. The stabiliser composition according to claim 1, wherein a maximum of 10% by weight of the one or more salts of a halogen-containing oxy acid disposed on said carrier material is mechanically separable from said carrier material.

4. The stabiliser composition according to claim 1, wherein said one or more salts of a halogen-containing oxy acid contain no crystallites having a size greater than 1 μm.

5. The stabiliser composition according to claim 1, wherein the stabiliser composition includes at least one inorganic salt of perchloric acid, organic salt of perchloric acid, or a combination thereof.

6. The stabiliser composition according to claim 5, wherein an organic salt of organic perchloric acid is selected from the group consisting of phosphonium perchlorate, sulfonium perchlorate, and ammonium perchlorate.

7. The stabiliser composition according to claim 1, further comprising at least one blowing agent.

8. The stabiliser composition according to claim 7, wherein the amount of blowing agent present in said stabiliser composition is from about 0.01 to 20% by weight, based on the weight of said stabiliser composition.

9. The stabiliser composition according to claim 1, further comprising at least one amino compound.

10. The stabiliser composition according to claim 1, wherein the ratio of said one or more salts of a halogen-containing oxy acid to said carrier material is from 1:100 to 1:1.

11. The stabiliser composition according to claim 1, further comprising one or more additives.

12. A process of preparing a stabiliser composition comprising:
    mixing a carrier material of the general formula $Ca_xAl_2(OH)_{2(x+2)}HPO_3 \cdot m\, H_2O$, wherein x is a number from 2 to 12 and m is a number from 0 to 12 with a solution comprising one or more salts of a halogen-containing oxy acid, wherein at least one of said one or more salts of a halogen-containing oxy acid being is dissolved in said solution.

13. The process of preparing a stabiliser composition according to claim 12, further comprising the step of adding one or more additives to said stabilizer composition after the step of mixing the carrier material with the solution comprising one or more salts of a halogen-containing oxy acid.

14. A method of stabilising a halogen-containing polymer, comprising mixing one or more halogen-containing polymers with a stabiliser composition comprising a carrier material of the general formula $Ca_xAl_2(OH)_{2(x+2)}HPO_3 \cdot m\, H_2O$, wherein x is a number from 2 to 12 and m is a number from 0 to 12, and one or more salts of a halogen-containing oxy acid, wherein at least one of said one or more salts of halogen-containing oxy acid is disposed on said carrier material in a finely distributed form, wherein the one or more halogen-containing polymers include halogen containing polymers selected from the group consisting of a halogen containing polymer, a mixture of two or more halogen containing polymers, and a mixture of one or more halogen containing polymers and one or more halogen-free polymers.

15. A stabiliser composition prepared by mixing a carrier material of the general formula $Ca_xAl_2(OH)_{2(x+2)}HPO_3.m\ H_2O$, wherein x is a number from 2 to 12 and m is a number from 0 to 12 with a solution comprising one or more salts of a halogen-containing oxy acid, wherein at least one of said one or more salts of a halogen-containing oxy acid is dissolved in said solution, and wherein the amount of said one or more salts of a halogen-containing oxy acid is from 1 to 50% by weight, based on the weight of the one or more salts of a halogen-containing oxy acid and carrier material.

16. The stabiliser composition according to claim 15, wherein the stabiliser composition further comprises one or more additives that is prepared by adding the one or more additives to said stabiliser composition after the mixing of the carrier material with the solution comprising one or more salts of a halogen-containing oxy acid.

17. The stabiliser composition according to claim 15, wherein said one or more salts of halogen-containing oxy acid comprises a mixture of two or more salts of halogen-containing oxy acid.

18. A polymer composition comprising:
one or more halogen-containing polymers; and
a stabiliser composition comprising a carrier material of the general formula $Ca_xAl_2(OH)_{2(x+2)}HPO_3.m\ H_2O$, wherein x is a number from 2 to 12 and m is a number from 0 to 12, and one or more salts of a halogen-containing oxy acid, wherein at least one of said one or more salts of halogen-containing oxy acid is disposed on said carrier material in a finely distributed form.

19. The polymer composition according to claim 18, wherein the amount of stabiliser composition in the polymer composition is from about 1 to 12 per hundred resin.

20. The polymer composition according to claim 18, wherein the polymer composition is in the form of a moulded article.

* * * * *